United States Patent [19]

Covey

[11] Patent Number: 4,866,839
[45] Date of Patent: Sep. 19, 1989

[54] METHOD FOR FORMING A HIGH-CONDUCTIVITY JUNCTION BETWEEN COMPOSITE STRUCTURES AND METAL FITTINGS

[75] Inventor: James H. Covey, Snohomish, Wash.

[73] Assignee: The Boeing Company, Seattle, Wash.

[21] Appl. No.: 112,687

[22] Filed: Oct. 23, 1987

[51] Int. Cl.$^4$ .......................................... H01R 43/00
[52] U.S. Cl. ..................................... 29/825; 156/73.5; 361/218; 411/908
[58] Field of Search ................ 29/825, 402.15, 402.17; 174/2; 361/215, 218; 156/73.5; 411/258, 908, 82, 366

[56] References Cited

U.S. PATENT DOCUMENTS

| | | | |
|---|---|---|---|
| 3,481,803 | 12/1969 | Hewitt | 411/908 X |
| 3,689,334 | 5/1972 | Dermody | 156/73.5 |
| 3,755,713 | 8/1973 | Paszkowski | 361/218 |
| 4,502,092 | 2/1985 | Bannink, Jr. et al. | 361/218 |
| 4,551,189 | 11/1985 | Peterson | 156/73.5 |
| 4,630,168 | 12/1986 | Hunt | 361/218 |
| 4,681,497 | 7/1987 | Berecz | 411/908 X |

FOREIGN PATENT DOCUMENTS 1000192  1/1986  Japan ................................. 156/73.5

Primary Examiner—P. W. Echols
Assistant Examiner—Carl J. Arbes
Attorney, Agent, or Firm—Seed and Berry

[57] ABSTRACT

A method for providing a junction between metal fittings in a composite structure is disclosed which reduces susceptibility of the junction to electrical arcing during a natural lightning strike. A bore is formed in the composite structure which has a diameter approximately equal to a portion of the metal fitting. In a first embodiment, the bore is provided with internal threads. The metal fitting is provided with cooperative threads which engage the bore to form an interference fit. The metal fitting is continuously rotated into the bore to generate substantial heat therebetween until the metal fitting is fully seated. A substantially void-free interface between the metal fitting and the composite structure results which is preconditioned to a lightning strike. The junction is capable of withstanding current flows of up to 30 kA for the particular part described without the occurrence of electrical arcing.

12 Claims, 2 Drawing Sheets

METHOD FOR FORMING A HIGH-CONDUCTIVITY JUNCTION BETWEEN COMPOSITE STRUCTURES AND METAL FITTINGS

STATEMENT OF GOVERNMENT INTEREST

The government has rights in this invention.

TECHNICAL FIELD

The invention relates to construction techniques for joining metal components with composite structures. More specifically, the invention relates to lightning protection techniques for aircraft manufactured from composite materials and metal components.

BACKGROUND ART

Modern aircraft construction methods increasingly employ composite materials as structural components. Composite materials have displaced the use of aluminum in such structural components as spars, ribs, stringers, bulkheads, and aircraft skin. Additional uses of composite materials are contemplated, such as internal fuel tanks made entirely from composites.

Composite structures have numerous advantages over materials such as aluminum. Composite structures can be custom tailored to resist stresses in particular directions, whereas aluminum and other metal structural materials are generally amorphous and thus resist stress in all directions. As a consequence, a composite structure is substantially lighter than an equivalent aluminum structure. As is well known, lightweight structures are highly desirable for aircraft, as reduced weight results in increased performance. Furthermore, it is known that composite structures have a substantially longer fatigue life than materials such as aluminum. An aluminum aircraft typically has a fatigue lifetime of approximately 30,000 hours, whereas composite structures on aircraft may have fatigue lifetimes in excess of approximately 100,000 hours.

In view of the above, it would appear desirable to construct an aircraft entirely from composite materials. However, for a variety of reasons, metal components are still required in the aircraft. For example, metal fittings, such as fuel filler caps, fuel line fittings, and various fittings which penetrate composite structures, are readily available as metal components. Furthermore, these components are certified for flight. Therefore, it is desirable to use these metal components with composite structures of an aircraft.

A particular problem involving the use of metal components in a composite-structure aircraft is dissipation of electrical discharge from a natural lightning strike. In an all-metal aircraft, electrical discharge is readily distributed throughout the aircraft without arcing, because the various components generally have substantially similar electrical conductivity characteristics, coefficients of thermal expansion, etc.

Such discharges are only dangerous when electrical arcing occurs between two parts. For example, in an all-metal aircraft having an aluminum fuel tank and an aluminum fuel temperature sensor therein, any electrical arcing between the fuel tank and the fuel tank temperature sensor could result in a disastrous explosion. Electrical arcing occurs when the mechanical connection between the fuel tank and fuel sensor has a higher electrical resistance than an air gap therebetween. As in any electrical circuit, resistance heating according to Ohm's law occurs. Where an air gap between components becomes the conductive path for an electrical discharge, the resistance heating which occurs in the air gap is at a temperature which is sufficient to ignite fuel vapor in the fuel tank.

The above problem is not particularly acute in all-metal aircraft, where relatively good mechanical connection between components is easily achieved. However, electrical arcing has been known to occur where composite structures are joined to metal fittings in the presence of a current flow of up to approximately 30 kA or more. It is highly desirable that aircraft withstand current flows of up to 30 kA or more without arcing to internal components in order to be considered safe from the deleterious effects of lightning discharges.

A typical composite structure/metal component interface exists between an aluminum fuel temperature sensor 14 and a composite structure fuel tank 16, as shown in FIG. 2. The fuel tank may be constructed from a plurality of layers of graphite fabric impregnated with an epoxy resin. A bore 18 is formed in the tank to receive the fuel temperature sensor. The temperature sensor has an electrical sensor connection and bolt head 20 which resides on the outside of the fuel tank and a sensor probe 22 which extends through the bore and into a cavity defined by the fuel tank. A threaded portion 28 also extends into the fuel tank. A nut 30 is engaged with the threaded portion and secures the sensor to the fuel tank. O-rings or other sealing devices are also employed to provide a leak-proof connection.

It has been found that the above assembly repeatedly fails a 30 kA anticipated lightning threat test. In the test, electrical arcing often occurred between the composite-structure fuel tank 16 and the fuel temperature sensor 14. Gaps 26 exist in the mechanical connection between the tank and sensor, causing electrical arcing and resistance heating which could detonate fuel vapor.

In view of the above, a need exists for a method of providing a highly electrically conductive junction between metal fittings and composite structures. The resulting interface between the composite structure and metal fitting should be capable of withstanding a current flow of up to 30 kA or more without arcing.

DISCLOSURE OF THE INVENTION

It is an object of the present invention to provide a method for forming a highly electrically conductive junction between a composite structure and a metal fitting.

The invention achieves these and other objects by forming a substantially void-free interface between a metal fitting and a composite structure. In a first step, a bore is formed in the composite structure. A threaded metal fitting is then introduced into the bore. The threaded portion of the metal fitting and the bore have diameters selected so as to form an interference fit therebetween. The metal fitting is continually rotated during insertion into the bore so that substantial heat is generated at the interface therebetween. Rotation is stopped when a predetermined torque is achieved whereby a substantially void-free interface between the composite structure and the metal fitting is developed. The interface is characterized by substantial resistance to electrical discharge arcing.

In a first preferred embodiment of the invention, the bore in the composite structure is threaded before the metal fitting is inserted into the bore. The metal fitting is threaded cooperatively so as to form an interference fit with the threaded bore. The threads are first engaged manually, and then the metal fitting is continuously rotated into the bore.

In a second preferred embodiment, the bore in the composite structure is not threaded. Instead, the threaded metal fitting has a self-tapping portion which is engaged with the bore. The self-tapping mnetal fitting is then continuously rotated into the bore so that substantial heat is generated at an interface between the bore and the metal fitting. The rotation is stopped when a predetermined torque is achieved.

In each of the preferred embodiments, the interface is preconditioned to an electrical discharge where the composite structure includes a plurality of fibers having a statistical distribution of fiber thickness. Substantial heating at the interface generated by friction on driving the threaded metal fitting into the bore "shorts out" the thinner fibers, leaving only the thicker fibers in contact with the threaded metal fitting as current conductors. In a graphite fiber/epoxy resin composite, statistically there are approximately 16 million 7-micron fibers per inch. Two percent of the fibers are smaller than 7 microns, two percent are larger than 7 microns, and the rest are approximately equal to 7 microns.

It is preferred to construct the metal fitting from materials which are corrosion resistant in the selected composite structure. For example, in a graphite fiber-/epoxy resin composite, it is desirable to construct the metal fitting from titanium, as titanium is substantially corrosion resistant in an epoxy resin environment.

BRIEF DESCSRIPTION OF THE DRAWINGS

BEST MODE FOR CARRYING OUT THE INVENTION

Figure 1:
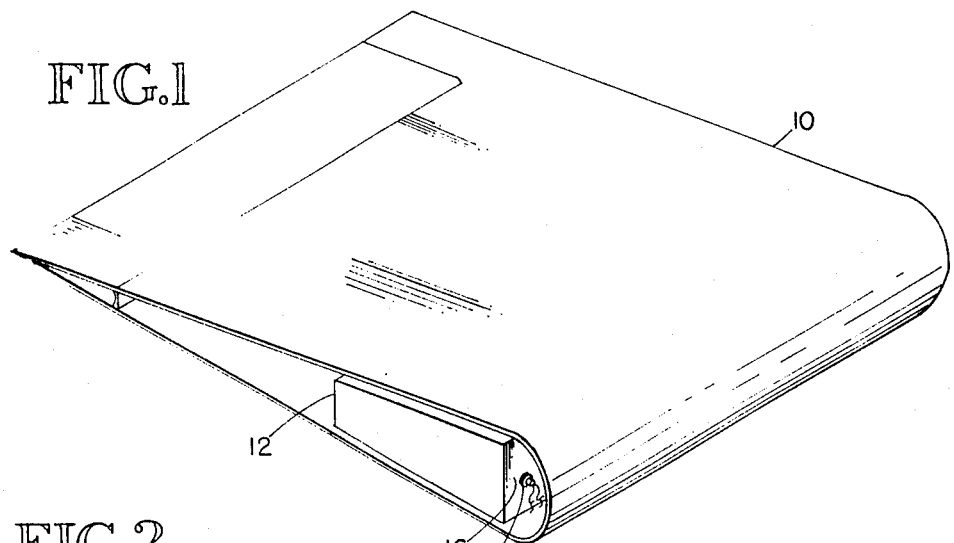
FIG. 1 is an isometric, sectional view of an aircraft wing having an internal, composite structure fuel tank. The fuel tank has a fuel temperature sensor installed by the method of the present invention.

An aircraft wing section 10 having an internal, composite-structure fuel tank 12 is shown in FIG. 1. The fuel tank has a fuel temperature sensor 14 which protrudes into the interior of the fuel tank. The fuel temperature sensor is connected to the fuel tank by the method of the present invention. Although the method of the present invention is described in connection with the compositestructure fuel tank and a metal fuel temperature sensor, it is to be understood that the method of the present invention is applicable wherever a metal fitting is to be connected to a composite structure.

Figure 2:
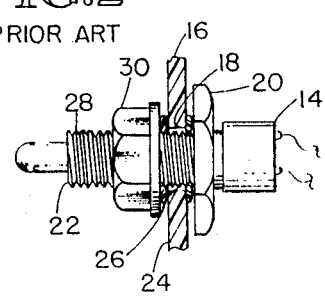
FIG. 2 is an enlarged, sectional, elevational view of a prior art method for mechanically fastening a fuel temperature sensor to a composite-structure fuel tank.

FIG. 2 illustrates a prior art method for connecting the fuel temperature sensor 14 to a wall 16 of the fuel tank 12. As previously stated, the wall 16 has a bore through which the fuel temperature sensor 14 protrudes. The fuel temperature sensor has a head 20 to provide a bearing surface for a wrench. The fuel temperature sensor also has an elongated member 22 which extends to the inside 24 of the fuel tank. The elongated member has a diameter of approximately 9/16 inch. The bore 18 is slightly larger to accommodate the elongated member 22. A gap 26 (exaggerated) therefore exists between the elongated member 22 and the bore 18. It is at this gap where electrical arcing is likely to occur. The elongated member also has a threaded portion 28 which receives a nut 30 to secure the fuel temperature sensor to the fuel tank wall 16.

Figure 3:
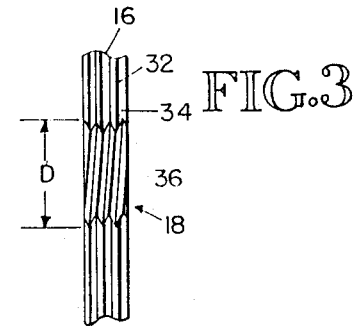
FIG. 3 is an enlarged, sectional, elevational view of a threaded bore in a composite structure of the present invention.

The present invention overcomes the disadvantages of the prior art method by providing a substantially voidfree interface between the fuel temperature sensor 14 and the fuel tank wall 16. As shown in FIG. 3, the fuel tank wall 16 includes a plurality of graphite fibers 32. The fibers have a mean diameter and a statistical distribution of fiber diameters about the mean diameter. The graphite fibers are woven into layers of fabric which are impregnated with an epoxy resin 34. The epoxy resin is cured at a temperature of approximately 350° to 400° F.

In a first step, a bore 18 is drilled for a 9/16-inch, class 3-A tap. The bore may be slightly oversize by no more than about 0.005 inch to accept the tap. It is highly preferred that the size of the bore be approximately equal to the diameter of the elongated member 22. In a second step, the bore 18 is tapped with a 9/16-inch, class 3-A, well-worn tap to form internal threads 36. In a third step, the elongated member 22 on the fuel temperature sensor 14 is cooperatively threaded with a die to form cooperative threads 40. The internal threads 36 and cooperative threads 40 are preferably sized so that the threads form an interference fit when engaged. Although the bore is described herein as being about 9/16-inch, it will be understood that bores of other diameters may be formed to accommodate metal fittings having other diameters.

Figure 4:
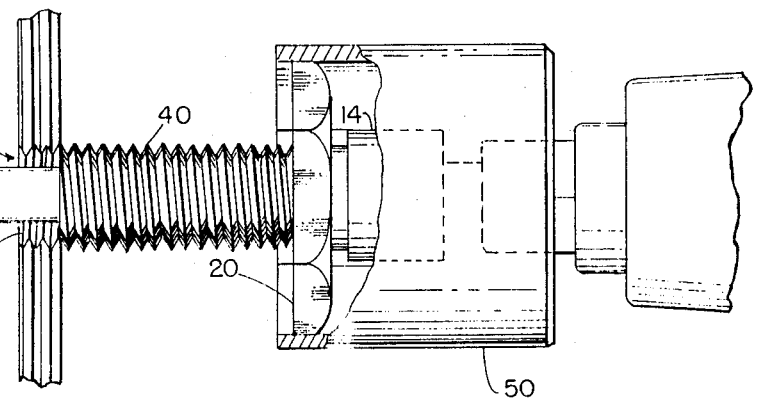
FIG. 4 is an enlarged, sectional, elevational view of the composite structure of FIG. 3, including a threaded fuel sensor in position to be driven into the bore.

As shown in FIG. 4, the threads 36, 40 are manually engaged prior to application of torque to the head 20 of the fuel temperature sensor. The cooperative threads 40 may be coated with cetyl alcohol to act as a thread lubricant.

Figure 5:
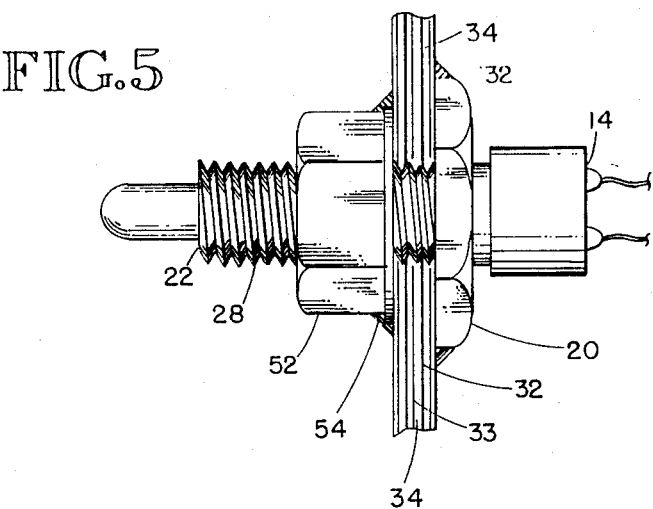
FIG. 5 is an enlarged, sectional, elevational view similar to FIGS. 3 and 4, illustrating the sensor in place with fibers in the composite structure preconditioned for an electrical discharge.

A constant torque, high-speed driver 50 is used to continuously rotate the fuel temperature sensor 14 into the bore 18. It is important that the fuel temperature sensor be continuously rotated into the bore without stopping. Friction between internal threads 36 and cooperative threads 40 generates substantial heat. Temperatures of up to 250° F. may be obtained while driving the fuel temperature sensor into the bore. If rotation of the fuel temperature sensor is stopped before the fuel temperature sensor is fully seated, as shown in FIG. 5, the fuel temperature sensor may freeze in the bore. Further rotation of the fuel temperature sensor will be impossible. Therefore, as shown in FIG. 5, the fuel temperature sensor should be continuously rotated by the constant torque, high-speed driver until the fuel temperature sensor is fully seated. It is preferred to install the sensor to a torque of approximately 170 in-lbs.

Immediately upon fully seating the fuel temperature sensor 14, a nut 52 and washer 54 (see FIG. 5) should be installed on the threaded portion 28 of the elongated member 22 which exctends from the bore 18. The nut should be tightened to a torque of 170 in-lbs by holding the head 20 of the fuel temperature sensor 14 with a wrench while applying torque to the nut 52. The nut 52 and fuel temperature sensor 14 should be allowed to cool before they are touched. They will be hot.

It is believed that generation of substantial heat during the installation of the fuel temperature sensor 14 desirably preconditions the interface between the fuel temperature sensor 14 and fuel tank wall 16. Those graphite fibers 33 having a less than average diameter are 'shorted out' and retract from the cooperative thread 40 on the fuel temperature sensor 14. This leaves only the graphite fibers 32, having an average or larger than average diameter in contact with the cooperative threads 40 on the fuel temperature sensor 14. These "large" fibers effectively act as electrical conductors, resulting in less resistance heating.

As stated above, the interface between the fuel temperature sensor 14 and bore 18 is substantially void free. As compared to the prior art method shown in Figure 2, the surface area of contact between the bore 18 and elongated member 22 of the fuel temperature sensor 14 is increased by approximately 60%. Thus, the electrical resistivity of the interface therebetween is proportionally decreased. This results in substantially lower power dissipation at the interface due to resistive heating during a lightning strike. It has been found that the above structure is capable of withstanding current discharges of up to 30 kA without electrical arcing occurring at cold environmental temperatures and elevated temperatures. Furthermore, heat generated during resistance heating from an electrical discharge has been found to be at a temperature less than the flash point of fuel vapor within the composite-structure, internal fuel tank 12.

The method described above is applicable to installation of metal fittings of virtually any type in a composite structure. For example, the inventive method may be applied to bezels for fuel filler fittings, circular deck plates, etc.

Alternate embodiments of the invention are contemplated. For example, in a second embodiment of the invention, a threaded metal fitting has a self-tapping portion. In this embodiment, a bore is formed having a diameter approximately equal to the diameter of the threaded metal fitting. The bore is not threaded. The fitting is then driven into the bore as previously described. However, the nut 52 and washer 54 are not used. Other embodiments of the invention are also contemplated. Therefore, the invention is not to be limited by the above description, but is to be determined in scope by the claims which follow.

I claim:

1. A method for forming a highconductivity junction between a thermosetting composite structure and a metal fitting, comprising the steps of:
   forming a bore in a thermosetting composite structure;
   threading the bore with a thread pitch at a first diameter;
   cooperatively threading a metal fitting at the same thread pitch wherein the metal fitting has a second diameter slightly larger than the first diameter so as to form an interference fit with the threaded bore;
   engaging the threads;
   continually rotating the metal fitting into the bore so that substantial heat is generated at an interface therebetween; and
   stopping the rotation when the metal fitting is fully seated in the bore, whereby a substantially void-free interface between the composite structure and the metal fitting is developed and is characterized by substantial resistance to electrical discharge arcing.

2. The method of claim 1 wherein the metal fitting has a threaded portion which protrudes from the bore, including the steps of:
   rotatably restraining the metal fitting with respect to the composite structure;
   positioning a nut on a protruding portion of the threaded metal fitting; and
   tightening the nut to a predetermined torque.

3. The method of claim 1 wherein the composite structure includes a plurality of fibers having a statistical distribution of fiber diameters with respect to a mean fiber diameter and wherein, during the continuous rotation step, the metal fitting is rotated so that sufficient local heating occurs to precondition the interface for an electrical discharge.

4. The method of claim 3 wherein the metal fitting is continually rotated so that a local temperature of approximately 250° F. is achieved.

5. The method of claim 1 wherein the metal fitting has a substantially corrosion-resistant external surface.

6. The method of claim 5 wherein the metal fitting is constructed from titanium.

7. The method of claim 1 wherein the rotation is stopped when a predetermined torque of approximately 170 inch-pounds is achieved.

8. A method for forming a high-conductivity junction between a thermosetting composite structure and a metal fitting, comprising the steps of:
   forming a bore having a first diameter in a thermosetting composite structure;
   engaging a self-tapping, threaded metal fitting having a second diameter slightly larger than the first diameter within the bore, wherein the bore and threaded portion of the metal fitting form an interference fit;
   continually rotating the metal fitting into the bore so that substantial heat is generated at an interface between the bore and the metal fitting; and
   stopping the rotation when a predetermined torque is achieved, whereby a substantially void-free interface is developed between the metal fitting and the composite structure and wherein the interface is characterized by substantial resistance to electrical discharge arcing.

9. The method of claim 8 wherein the composite structure includes a plurality of fibers having a statistical distribution of fiber diameters with respect to a mean fiber diameter and wherein, during the continuous rotation step, the metal fitting is rotated so that sufficient local heating occurs to precondition the interface for an electrical discharge.

10. The method of claim 8 wherein the metal fitting is continually rotated so that a local temperature of approximately 250° F. is achieved.

11. The method of claim 8 wherein the metal fitting has a substantially corrosion-resistant external surface.

12. A method for forming a low-resistance electrical connection between a graphite fiber/epoxy resin composite structure and a metal fitting, comprising the steps of:
   forming a bore in a composite structure having graphite fibers and an epoxy resin;
   threading the bore to form bore threads;

cooperatively threading the metal fitting to form cooperative threads so that the bore threads form an interference fit with the cooperative threads on the metal fitting; and rotating the metal fitting into the bore so that sufficient heat is generated between the bore and the metal fitting to form a substantially void-free interface therebetween which is characterized by substantial resistance to electrical discharge arcing.

* * * * *